United States Patent
McClure, Jr. et al.

(10) Patent No.: US 6,655,548 B2
(45) Date of Patent: Dec. 2, 2003

(54) REDAN

(75) Inventors: John E. McClure, Jr., Annandale, VA (US); David S. Romerstein, Springfield, VA (US)

(73) Assignee: Els, Inc., Arlington, VA (US)

( * ) Notice: Subject to any disclaimer, the term of this patent is extended or adjusted under 35 U.S.C. 154(b) by 0 days.

(21) Appl. No.: 09/825,558

(22) Filed: Mar. 27, 2001

(65) Prior Publication Data

US 2003/0105553 A1 Jun. 5, 2003

Related U.S. Application Data

(60) Provisional application No. 60/192,471, filed on Mar. 27, 2000.

(51) Int. Cl.[7] .................................................. B67D 5/08
(52) U.S. Cl. .......................... 222/57; 222/64; 222/132; 222/145.1
(58) Field of Search ........................... 222/57, 64, 132, 222/145.1

(56) References Cited

U.S. PATENT DOCUMENTS

| 4,265,266 | A | * | 5/1981 | Kierbow et al. | ............... 222/57 |
| 5,246,026 | A | * | 9/1993 | Proudman | ................... 222/57 |
| 5,653,533 | A | * | 8/1997 | Green | ......................... 222/52 |

* cited by examiner

Primary Examiner—Philippe Derakshani
(74) Attorney, Agent, or Firm—Howard L. Rose

(57) ABSTRACT

A remote access and control system having two pc's, a first of which receives information concerning a condition to be controlled, a controller for controlling the condition, information concerning the condition being supplied to the second pc, said second pc develops further information for controlling the condition, such further information is supplied to the first pc and this information is applied to the controller to have the controller maintain the desired conditions.

1 Claim, 2 Drawing Sheets

REDAN

This appln claims the benefit of Prov. of 60/192,471 filed Mar. 27, 2000.

FIELD OF THE INVENTION

The present invention relates to remote engineering diagnostic and analysis networking, and more specifically to a system for acquiring information from many locations, processing it and transmitting processing information to various locations which may include some or all of the information supplying locations.

BACKGROUND OF THE INVENTION

There are numerous systems for acquiring information from many remote locations and processing the information. These include activities in almost every manufacturing field, from food processing to auto manufacture. Remote monitoring capabilities have been developed in all cases to maintain and improve the quality of the produce, to improve the safety of the process, to reduce waste, and to use labor more efficiently.

Machine actions or measures that can be remotely monitored include: movement; storage quantity or level; machinery operation; valve position; pipeline flow; and weight. Physical or chemical measures that can be remotely monitored include: temperature; pressure, pH; dissolved oxygen, metallic ions; specific conductance in liquids; and gasses.

Specific measuring points in processes include: liquid levels in tanks; liquid flow in pipes; air flow in ducts; motors in operation or not; total or differential pressures in fluid systems; presence or concentration of explosive or other gasses; weights of solid material moving on conveyor belts; as well as all of the chemical measures noted above; from all process points determined to be critical.

Operations monitoring can be done by means of continuous automatic reading instrumentation and by intermittent readings reported automatically or manually. The monitoring data can be delivered to various points by direct wire or by phone line, and various alarm points or threshold values can be built in to the data collection devices. All of the above capabilities are currently available.

Additionally, other systems have been developed that allow "teleconferencing" by means of closed circuit television and phone connections operating both ways between, or among remotely located parties. This type of communication is used both for information exchange among parties on particular subjects of concern, and for training without the expense of travel by the trainer or trainees to a central location. This capability is currently available in various forms.

Finally, many systems have been developed and are available for picturing objects and/or areas with TV cameras and transmitting the imaging by closed circuits of various types for security, or other reasons.

As noted above, various types of remote monitoring of operations are currently in use for a variety of purposes; however, there does not appear to be a system available that unites all of the types of process monitoring and storing inputs that are available, with capabilities for either remote on-line conferencing or training in real time, with data and image storage, retrieval, and manipulation capabilities, which uses a secure internet service for communication.

The uniting of all of these various aspects of a process into one comprehensive and structured platform, where the process is then amenable to modern management standards and practices such as ISO 9000, ISO 14000, and QS 9000 for the auto industry, is believed to be unique in the REDAN concept. All of these standards require a comprehensive and continuing monitoring of all the critical aspects of an operation, maintenance of records, capabilities for seeking continual improvement, management review, operating personnel training, and auditability by the owner, and other organizations and stakeholders.

SUMMARY OF THE PRESENT INVENTION

A site with operations to be examined, controlled and monitored is equipped with an on-site PC, various appropriate automatic process monitoring sensors relaying data directly to the PC, imaging equipment relaying visual data to the PC, and data entry and retrieval equipment for manually entering data and/or reviewing data already entered to the PC. The on-site PC is equipped with a computer program (software) which allows it to receive the incoming data and images from the site, manipulate the date appropriately, and transmit them to a network server. The software installed in the on-site PC allows signals to be relayed from the network server through it to various appropriate mechanisms or signal devices installed at the site, or elsewhere, as well as data and images displayed at the operating site PC to the operating personnel there.

A site or sites with an interest in examining and monitoring operations at remote operating site or sites is each equipped with PC's equipped with software that allows data and images from the remote operating site(s) to be retrieved from the server, examined and/or diagnosed and analyzed, and allows an interested site(s) to send appropriate signals to the remote operating site(s), as well as data and images to be displayed at the PC of the operating site(s) to the operating personnel there.

An appropriate site (not necessarily either operating sites or interested sites) contains the server, which is equipped with software to allow it to receive, manipulate, store and transmit data and images to and from both remote operating sites and interested sites, and allows access to the software by computer network technical managers (network engineers) to maintain the system software.

Other features, objects and advantages of the present invention, together with the best means contemplated by the inventor thereof for carrying out the invention will become more apparent from reading the following description of a preferred embodiment and perusing the associated drawings in which:

DETAILED DESCRIPTION OF THE PRESENT INVENTION

Figure 1:
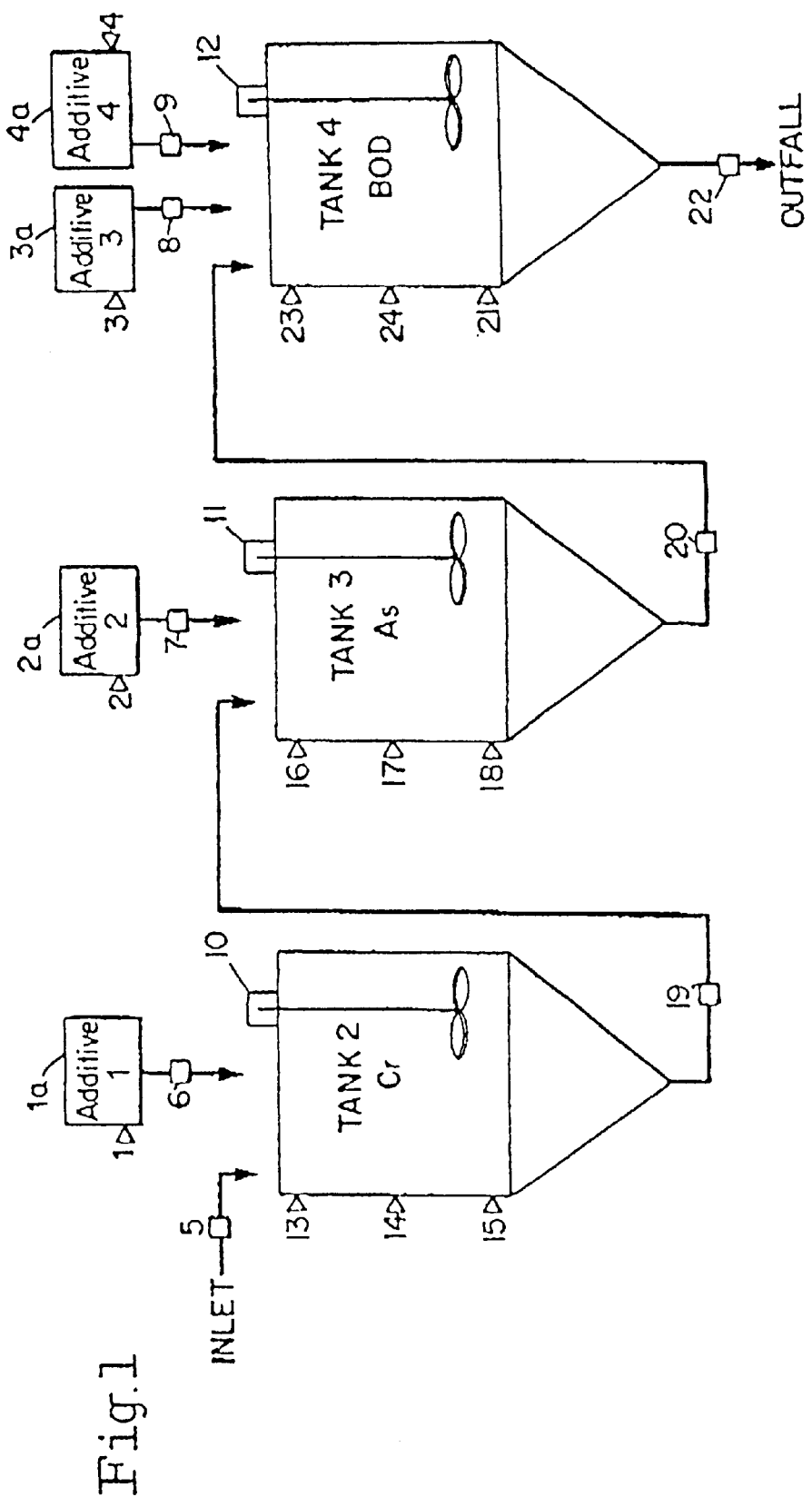
FIG. 1 illustrates an example of the type of the treatment equipment controlled by the invention.

Referring now to FIG. 1, there is illustrated an example of the use of the system to control a water treatment plant to eliminate chrome and arsenic from the effluent from a Tannery. The system senses numerous parameters to provide the appropriate control of the system.

This particular system employs three treatment tanks or vats, 2, 3 and 4, the tank 2 used to eliminate chromium, the vat 3 to eliminate arsenic and the vat 4 to first eliminate hydrocarbons by treatment by biological material and to receive nutrients to maintain the life of the biological material.

Specifically, the flow of the effluent from the tannery is directed to the tank 2 via valve 5. The level of effluent in the tank 2 is measured by sensors 13, 14 and 15. The level is maintained preferably at the level of sensor 14 by controlling flow through valves 5 and valve 19. The material for neutralizing chrome is fed into tank 2 via a valve 6. The material being supplied via a valve 1 to a storage tank 1a.

When conditions in tank 2 as determined at the site 14, mixing to insure uniformity accomplished by a stirrer driven by motor 10, flow into the tank is discontinued or control of valves 5 and 19 is such that the chrome content is held at all times at a safe level.

Flow through value 19 is directed to tank 3 where Arsenic is to be removed. The process here wants to maintain the Arsenic at a safe level and flow in and out is controlled by valve 19 and 20, respectively. In all other respects the operation is essentially the same with the only real difference being in the chemicals used to neutralize the Arsenic.

Flow into the tank 4 is controlled by valve 20 and flow out is controlled by valve 22. Again, the flows may be balanced together with the flow of treatment material such that a continuous flow is developed. The level and condition of the material may be sensed at the sensing station 20.

Treatment at tank 4 is to reduce hydrocarbon content in the effluent from Tannery. The material added from a reservoir 23 through valve 8 is a microorganism that eats hydrocarbons and maintains them at acceptable levels. The material added from reservoir 24 is food for the microorganisms.

Thus the effluent from tank 4 has environmentally acceptable levels of chrome, arsenic and hydrocarbons.

Figure 2:
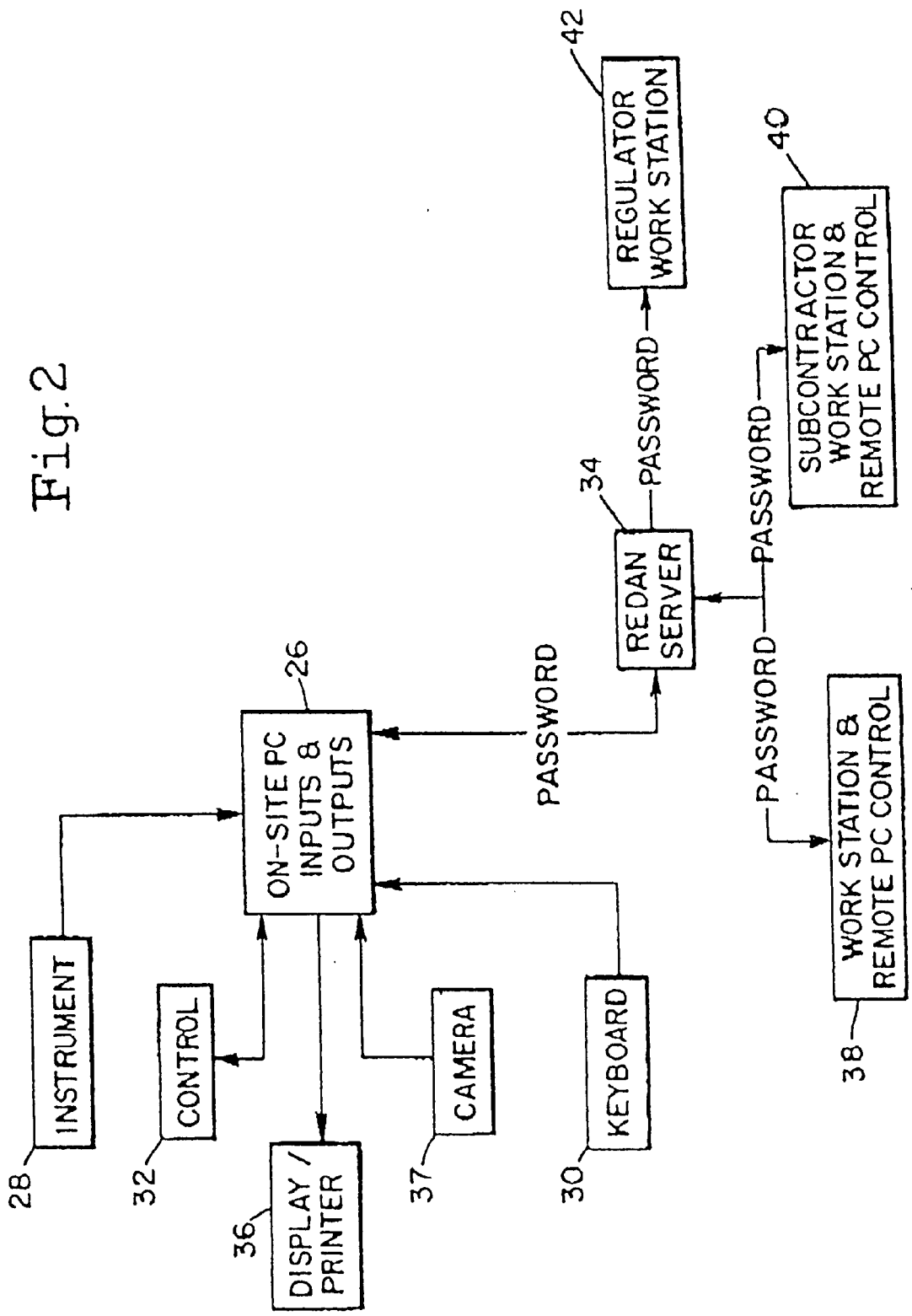
FIG. 2 illustrates the remote control arrangement that digests the information provided from the vats and send information back to a PC at the equipment location, and to others.

Control of the various functions of the system may be manual by an attendant or automatic under control of a receiving station. Referring to FIG. 2, an on-site PC 26 sends the information detected at each vat by instruments 28. A keyboard 30 operating through a control 32 selects the vats one by one to be integrated. The control 32 responding to the inputs from the keyboard transmits the information to a server 34.

The PC 26 may also, again under control of the keyboard, printout information, as desired on a printer 36. If provided pictures taken by camera 38 may be printed out and for transmittal to server 34. The local attendant is the primary user of the printout.

The server 34 directs the information to work stations and remote pc control 38 to subcontractor work station 40 and pc control. The results of the analysis provided by the work stations is gated to regulator work station 42 which produces appropriate signals to be sent back to the on-site pc 26. The on-site pc supplies appropriate signals to the control 32 that effects the operation of the vats, actually the various valves of the vats. The on-site pc 26 controls the distribution of the signals to insure that the appropriate signals are directed to the proper vat controls; that is, valves.

The attendant, using the printout, can determine if the proper adjustments were made by producing a further printout after an appropriate period of time.

All transmission links are protected by a password.

Once given the above disclosure, many other features, modifications and improvements will become apparent to the skilled artisan. Such features modifications and improvements are, therefore, considered to be a part of this invention, the scope of which is to be determined by the claims.

What is claimed is:

1. A flow control system for controlling flows into one or more vessels comprising means for sensing the condition of a different fluid in one or more of several vessels means for flowing one or more additives into said vessels to have said fluid in each vessel to attain a desired value flowing the fluid through successive ones of said vessels to achieve a desired final product.

* * * * *